United States Patent [19]
Eberhard

[11] 3,934,771
[45] Jan. 27, 1976

[54] RADAR MOUNT AND HOLDING BRACKET

[76] Inventor: Frank A. Eberhard, 418 N. Birney St., Bay City, Mich. 48706

[22] Filed: Mar. 5, 1974

[21] Appl. No.: 448,402

[52] U.S. Cl. .................. 224/42.42 A; 224/42.45 B; 224/42.46 B
[51] Int. Cl.² ............................................ B60R 7/04
[58] Field of Search .... 224/29 D, 42.42 A, 42.42 R, 224/42.45 B, 42.45 R, 42.46 R, 42.46 B, 42.43, 29 R

[56] References Cited
UNITED STATES PATENTS

| | | | |
|---|---|---|---|
| 1,742,822 | 1/1930 | Olson | 224/42.42 A UX |
| 2,784,889 | 3/1957 | Kennedy | 224/42.45 B |
| 2,869,146 | 1/1959 | Allison | 224/42.43 UX |
| 3,727,813 | 4/1973 | Eby | 224/42.42 R |
| 3,752,376 | 8/1973 | Shelton et al. | 224/42.45 B |

Primary Examiner—Robert J. Spar
Assistant Examiner—Jerold M. Forsberg
Attorney, Agent, or Firm—Cullen, Settle, Sloman & Cantor

[57] ABSTRACT

The bracket supports transmitter cone and control components of a standard radar scope at points entirely within the interior of a police patrol car, just to one side of the driver's position for convenient manipulation by him or by an accompanying officer.

The bracket is of limited and substantially uniform width throughout and, as frictionally held to the vehicle's upholstered driver seat back rest, it presents an upper horizontal plate portion which rests on and is cushioned by the back rest, upon which plate portion the scope cone is stably and adjustably mounted. A rearwardly and downwardly angled integral projection of said portion provides a clamping lip to assist in frictionally but releasably mounting the bracket to the seat back, without tearing or other damage to the latter. Forwardly of the scope-mounting plate member the bracket affords an intermediate upright panel of adjustable two-part construction which carries on its rear surface a vertically adjustable stop element for frictional engagement with the front of the seat cushion in furthering a releasable clamping of the bracket to the driver's seat.

17 Claims, 2 Drawing Figures

RADAR MOUNT AND HOLDING BRACKET

BACKGROUND OF THE INVENTION

1. Field of the Invention

The radar mount and holding bracket is, of course, intended for installation in state or municipal traffic control cars, an application identical to present day uses of the mobile radar scope, primarily in traffic speed control monitoring.

2. Description of the Prior Art

In such typical present day installations, the radar scope proper is mounted on the outside of the patrol vehicle, usually the latter's left rear window, with its cone aimed for scanning in a given direction and the set adjusted for picking up a reflected beam signal, as from a vehicle being pursued or approaching; or the cone may be aimed from a fixed monitoring location, as at the side of a street or highway. The control box unit is usually mounted to the vehicle dashboard; but in any case certain characteristics are present in use. The system or set as thus conventionally installed may well be detrimental to a full and unimpeded direct and/or peripheral or side vision on the part of personnel operating the car, or may even be illegal in some states. The usual location is also unfortunate in that the police officer or trooper must reach out of the window to operate the instrument; and an extended reach to a dashboard-mounted control box unit, particularly at high speed, may not only be inconvenient but also perilous. Drawbacks of this general sort are characteristic of most present day radar scope units of which I am aware. They may well constitute hazards of which the present improvement will be free.

SUMMARY OF THE INVENTION

The invention provides a stable and convenient mount for the radar scope and its control and read-out box to allow a more efficient and convenient use of both thereof. That is, pursuant to the invention the radar scope, as mounted in its entirety inside the vehicle, is in a position convenient to be aimed by the driver or an accompanying officer both to the front and to the rear, without leaving or materially changing his position in the vehicle. This operation may be performed safely, reliably and without physical or mental strain while the vehicle is in motion. All control buttons and the like on the control box are close at hand for the driver to manipulate, whether the vehicle is parked or in motion; the location of the control box is just to the driver's right and near or in the middle of the front seat of the patrol car. The mount unit is very compact, entailing minimal "cluttering" of space; and it presents no interference with two-way radio controls, with access to rifles or shotgun, etc. In fact, it offers a convenient storage place for a clipboard and assorted other flat paperwork items, maps, pencils, and the like. As indicated above, the bracket also affords protective storage till needed for items auxiliary to the use of the scope, for example, tuning forks for checking out the instrument prior to a patrol tour.

The unit is so simple in design and construction as to allow the assembly of its radar cone and control components in less than 20 seconds, with a power cable from the control box connected to a dashboard cigar lighter socket or other plug-in type connector member; and the assembly can be removed in the same time. The material of the one-piece bracket, preferably an acrylic plastic composition, is relatively inexpensive, and readily molded or otherwise formed to the bracket's special outline in vertical cross-section. Moreover, this type of non-metallic material will not snag, tear or otherwise mar the vehicle's upholstery.

Assurance is also had, in a special interlocking tongue formation of the bracket, that the unit will not be dislodged in the event of a quick stop or collision; and an adjustable stop is provided to insure a level horizontal position of the bracket's top plate surface on which the scope's cone is supported.

DESCRIPTION OF A PREFERRED EMBODIMENT

Figure 1:
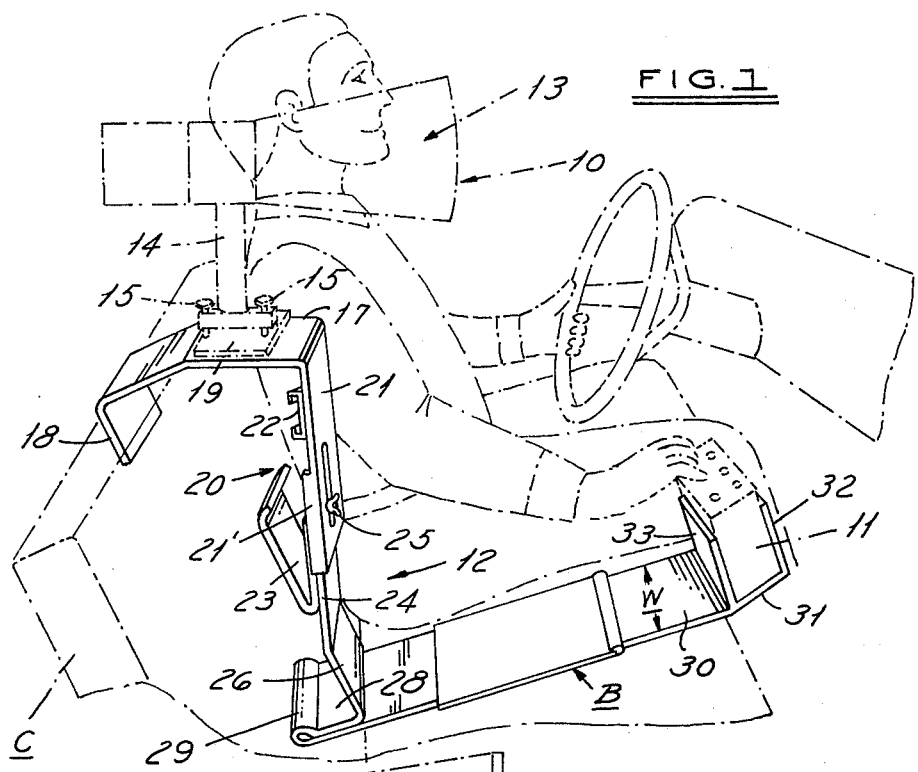
FIG. 1 is a fragmentary side perspective view illustrating a typical installation of the mounting bracket unit of the invention in a patrol vehicle installation, with outlines of the radar scope per se and its associated control box appearing in dot-dash line, as well as certain adjustable cone-leveling provisions.

FIG. 1 shows components of the radar scope unit, as mounted for use in a state or municipal police patrol vehicle, to comprise the scope's scanning cone unit, generally designated 10, and its control box unit, generally designated 11. Units 10 and 11 are typical of the basic components of a number of radar scope systems in everyday speed monitoring use. Once such producer (of the system herein depicted) is Kustom Electronics Company of 1010 West Chestnut Street, Chanute, Kansas 66720, the set being designated its "MR-7" radar scope and unit. The improved bracket mount of the invention is generally identified by the reference numeral 12.

Conventionally, the scanner 10 comprises a beam-emitting cone 13 which is firmly connected by an upright post 14 to the bracket mount 12 of the invention, in a location thereon hereinafter described in detail; and the control unit 11 is also supported at another place on the same mount for convenient access by the driver or his partner. The scanner unit 10 may be provided with adjustable leveling screws 15 by which an initial accurate horizontal setting of said unit relative to bracket 12 is made.

Figure 2:
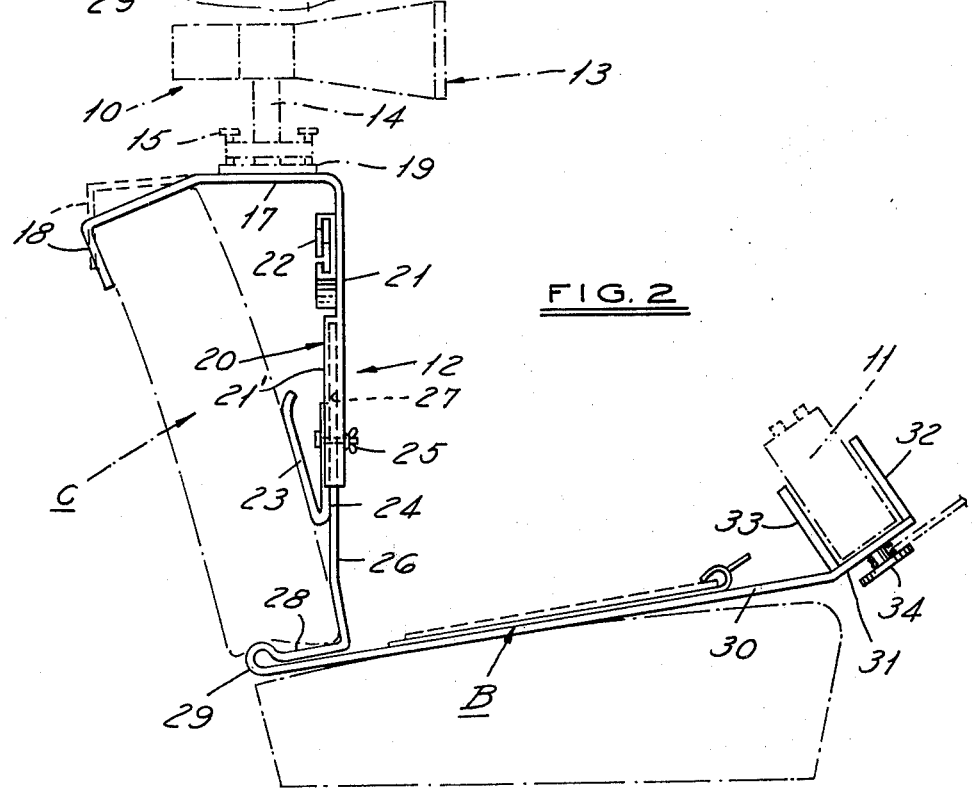
FIG. 2 is a side elevational view of the bracket with the associated radar scope units also appearing in dot-dash line.

Now referring more particularly to FIG. 2, bracket 12 is molded of a transparent acrylic or equivalent resin in a uniform side-to-side width throughout of about 5¾ inches, to provide an upper flat and horizontally disposed support plate portion 17 to which scope 10 is directly connected. This plate part is formed at its rear with an integral, angularly shaped clamp lip or flange 18 which, since the unit 12 is semi-rigid, may flex relative to the remainder of the bracket, as from the solid line position of FIG. 2 to the dotted line position, in applying the bracket and scope to the upright rear seat cushion C, then return flexibly into a clamping engagement of lip 18 and the back of the cushion. Support plate 17 will be equipped with an appropriate metal adapter pad 19 by which the post 14 of unit 10 is mounted thereon, with the leveling screws 15 downwardly engaging said pad.

The forward extremity of support member 17 integrally connects at about 90° to an upper component of a generally upright two-part frame panel unit 20 of bracket 12, which panel unit is approximately coextensive in overall height with the cushion C and will lie just to the right-hand side of the driver, and adjacent or at the midpoint of the patrol car's front seat when bracket 12 is properly applied. Said upper component of panel unit, as molded integral with support part 17, is designated 21 and is by preference provided on its rear surface with an open-ended receptacle formation 22 in which accessories to the use of the radar scope may be temporarily deposited, as mentioned above, until called for. They are thus, due to the plastic composition of the construction, protected from defacement or damaging motion in travel, just as the clamp lip 18 avoids tearing or other damage to the upholstery of cushion C.

At a point approximately midway of the upright dimension of frame panel 20 its part 21 is equipped at its rear with an adjustable stop clip 23 of V-shaped outline. This is also of molded acrylic and has a forward leg portion 24 releasably and adjustably connected to panel part 21, as by a wing screw 25 taking into an upright slot in said part and threadedly engaged appropriately at the rear of clip leg 24. The rear arm of stop 23 is forwardly bent mildly at its top, for a non-tearing yet positive engagement with the front upholstery of seat cushion C as the latter is frictionally engaged stably between clamp lip 18 and the stop 23.

A second molded plastic component 26 of frame panel unit 20 has an inclined upright and forward portion thereof on which the first-mentioned unit component 21 is slidably mounted for a vertically setting. Such mount is at an integral thickened portion 21' of panel part 21; and this adjustable connection may be made by the same screw 25 and slot means as enables an adjustment of the stop clip 23 relative to upright panel member. Thus a quick adaptation of bracket 12 as to height is possible to accommodate various sizes and designs of cushion. An elongated slot or way 27 in the rear of panel component 21' laterally guides the latter in its sliding adjustment on upright panel part 26.

Adjacent its lower end the mounting frame panel upright 26 is integrally formed to provide a rearward extension tongue 28, including an enlarged terminal bight formation 29. With the bracket 12 engaged with the cusion C and supported from above, the tongue 28 is thrust into the space between the back cusion C and the seat proper of the vehicle, its bight 29 binding frictionally beneath said cushion and thereby resisting forward dislodgment of the bracket mount from a proper position, as in consequence of a collision or sudden stop of the vehicle.

Finally, the part 26 of bracket 12 is molded in front of the stop bight 29 to provide an integral flat horizontal panel 30 of substantial rear-to-front length and a side-to-side width W (FIG. 1) of, say, 5¾ inches. Member 30 furnishes a stable supporting surface of substantial width and area which may be used by the driver or accompanying trooper or officer for a number of purposes. Typically, it may accommodate a clipboard B, or maps, violation tickets and other incidental appurtenances in a position handy for use. Adjacent its forward extremity the panel 30 of bracket 12 is formed with a mildly upwardly angled portion 31 which terminates in an approximately 90° upwardly angled restraining lip 32; and somewhat rearwardly of this lip formation the angled portion 31 carries a similar integral, 90° offset restraining lip 33. These formations 33 and 32 are proportioned as to their height and spacing from one another to conveniently accommodate the control box 11 of the radar scope assembly. The angularity of the mounting arrangement affords a reflection glare-free view of the control panel of box 13 and a very convenient reach to its control hand pieces.

Panel portion 31 is shown in FIG. 2 as being provided with a reel member 34 on which is wound a dashboard plug-in cable.

It is seen from the foregoing that the invention affords means for readily and releasably mounting components of a monitoring device in a vehicle interior, these including an upright panel part which has (a) means for the mounting of one component of said device in its entirety wholly within said interior, and (b) means for the mounting, also entirely within said vehicle interior, and in a close setting relative to the first-named means, of functionally related equipment of said device. More specifically, although other types of equipment may come into play, said upright panel part has a horizontal top extension on which a radar cone is supported as one component of a scope set, and has a further bottom lateral extension on which a control unit of the set is mounted as another such component.

What is claimed is:

1. A bracket for readily and releasably mounting components of a mobile radar scope set in a vehicle interior, said bracket comprising an upright panel part having plural means for the mounting, in its entirety and within the vehicle interior, of one component of said scope set, and also for the mounting, also entirely within the vehicle interior but out of physical engagement with an in substantially spaced relation to said one component, of another component of said scope set, in which said upright panel part has a lateral extension on which a radar cone is supported as said one component of said scope set, and has a further lateral extension spaced vertically from the first-named extension, on which further extension a control unit is mounted as said other component of said scope set, said lateral cone-supporting extension being horizontal and spaced vertically above said further extension, said upright panel part and first-named extension including means to frictionally and releasably engage an upright back cushion member of the vehicle interior, with said first-named extension resting atop said member and said further extension horizontally located in position to rest on a seat cushion member of the vehicle interior.

2. The bracket of claim 1, in which said upright panel part is of semi-rigid non-metallic material.

3. The bracket of claim 1, in which said upright panel part and said extensions are of semi-rigid non-metallic material.

4. The bracket of claim 2, in which said further extension is provided at a point forward of said upright panel part with spaced upright formations between which said control unit is received.

5. The bracket of claim 1, in which said further extension is provided at a point forward of said upright panel part with spaced upright formations between which said control unit is received.

6. The bracket of claim 3, in which said further extension is provided at a point forward of said upright panel part with spaced upright formations between which said control unit is received.

7. The bracket of claim 1, in which said upright panel part has means to adjust the upright dimension thereof in accommodating said extension to the upright back cushion member.

8. The bracket of claim 1, in which said upright panel part has means to adjust the upright dimension thereof in accommodating said extensions to the cushion members.

9. The bracket of claim 3, in which said upright panel part has means to adjust the upright dimension thereof in accommodating said extensions to the cushion members.

10. The bracket of claim 8, in which said further extension is provided with a rear tongue portion extending between and frictionally engaging the cushion members to hold the bracket in operative position relative thereto.

11. The bracket of claim 9, in which said further extension is provided with a rear tongue portion extending between and frictionally engaging the cushion members to hold the bracket in operative position relative thereto.

12. A bracket for readily and releasably mounting components of a monitoring or like device in a vehicle interior, said bracket comprising an upright panel part having plural means for the mounting, in its entirety and within the vehicle interior, of one component of said device, and also for the mounting, also entirely within said vehicle interior but out of physical engagement with and in substantially spaced relation to said one component, of another component of said device, in which said upright panel part has a first lateral extension on which one component of said device is supported, and has a second lateral extension spaced vertically from said first extension, on which second extension the other component of the device is mounted, said first lateral extension being horizontal and spaced vertically above said second lateral extension, said upright panel part and said first extension including means adapted to frictionally and releasably engage the front and back sides respectively of an upright back cushion member of the vehicle interior, said last mentioned means including a stop clip having a pair of legs, one of said legs being secured to said upright panel part and the other of said legs being adapted to engage the front side of the upright back cushion member.

13. A bracket for readily and releasably mounting components of a monitoring or like device in a vehicle interior, said bracket comprising an upright panel part having plural means for the mounting, in its entirety and within the vehicle interior, of one component of said device, and also for the mounting, also entirely within said vehicle interior but out of physical engagement with and in substantially spaced relation to said one component, of another component of said device, in which said upright panel part has a first lateral extension on which one component of said device is supported, and has a second lateral extension spaced vertically from said first extension, on which second extension the other component of the device is mounted, said first lateral extension being horizontal and spaced vertically above said second lateral extension, said upright panel part and said first extension including means adapted to frictionally and releasably engage the front and back sides respectively of an upright back cushion member of the vehicle interior, said last mentioned means including a downwardly turned flange on said first lateral extension and a stop clip secured to said upright panel part, said flange being adapted to engage the back side of the upright back cusion member, said clip including a pair of legs, one of said legs being adjustably secured to said upright panel part and the other of said legs being adapted to engage the front side of the upright back cushion member.

14. The bracket of claim 12, in which said second extension is provided at a point forward of said upright panel part with spaced upright formations between which the other component of the device is received.

15. The bracket of claim 12 in which said upright panel part has means to adjust the upright dimension thereof in accommodating said extensions to the cushion members.

16. The bracket of claim 12 in which said second extension is provided with a rear tongue portion extending between and frictionally engaging the cushion members to hold the bracket in operative position relative thereto.

17. The bracket of claim 16, in which said rear tongue portion includes an enlarged terminal bight formation which binds frictionally beneath the upright cushion member thereby resisting dislodgment of the bracket.

* * * * *